(12) United States Patent
Arulraj et al.

(10) Patent No.: US 12,201,969 B2
(45) Date of Patent: Jan. 21, 2025

(54) METHOD OF FORMING AN INORGANIC OXIDE COATING ON A MONOLITH ARTICLE

(71) Applicant: Johnson Matthey Public Limited Company, London (GB)

(72) Inventors: Kaneshalingam Arulraj, Royston (GB); Peter Bellham, Royston (GB); Alexander De Bruin, Reading (GB); Guy Richard Chandler, Royston (GB); Chris Corrigan, Royston (GB); David Marvell, Royston (GB); John Turner, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/820,290

(22) Filed: Aug. 17, 2022

(65) Prior Publication Data

US 2023/0076492 A1    Mar. 9, 2023

Related U.S. Application Data

(60) Provisional application No. 63/260,644, filed on Aug. 27, 2021.

(51) Int. Cl.
| | | |
|---|---|---|
| *B01J 29/72* | (2006.01) | |
| *B01D 53/94* | (2006.01) | |
| *B01J 21/08* | (2006.01) | |
| *B01J 21/12* | (2006.01) | |
| *B01J 23/02* | (2006.01) | |
| *B01J 23/40* | (2006.01) | |
| *B01J 29/70* | (2006.01) | |
| *B01J 35/56* | (2024.01) | |
| *B01J 37/02* | (2006.01) | |
| *B01J 37/08* | (2006.01) | |

(52) U.S. Cl.
CPC ............ *B01J 29/723* (2013.01); *B01D 53/94* (2013.01); *B01J 21/08* (2013.01); *B01J 21/12* (2013.01); *B01J 23/02* (2013.01); *B01J 23/40* (2013.01); *B01J 29/7007* (2013.01); *B01J 29/7015* (2013.01); *B01J 35/56* (2024.01); *B01J 37/0219* (2013.01); *B01J 37/082* (2013.01); *B01D 2255/2045* (2013.01); *B01D 2255/2092* (2013.01); *B01D 2255/50* (2013.01); *B01D 2255/502* (2013.01); *B01D 2255/9155* (2013.01); *B01D 2255/9202* (2013.01)

(58) Field of Classification Search
CPC . B01J 29/72; B01J 29/723; B01J 35/56; B01J 21/08; B01J 21/12; B01J 23/02; B01J 23/40; B01J 29/7007; B01J 29/7015; B01J 37/0219; B01J 37/082; B01D 53/94; B01D 2255/2045; B01D 2255/2092; B01D 2255/50; B01D 2255/502; B01D 2255/9155; B01D 2255/9202
USPC ......................................................... 502/523
See application file for complete search history.

(56) References Cited

U.S. PATENT DOCUMENTS

| | | |
|---|---|---|
| 8,789,356 B2 | 7/2014 | Phillips et al. |
| 2020/0306692 A1 | 10/2020 | Goodwin et al. |
| 2021/0260573 A1 | 8/2021 | Hotchkiss |

FOREIGN PATENT DOCUMENTS

| | | |
|---|---|---|
| WO | 2005/030365 A1 | 4/2005 |
| WO | 2011/151711 A1 | 12/2011 |
| WO | 2020/047708 A1 | 3/2020 |
| WO | 2020047479 A1 | 3/2020 |
| WO | 2021/028692 A1 | 2/2021 |

OTHER PUBLICATIONS

Heck, et al., "Catalytic air pollution control", Wiley, pp. 338-340, 2009.

*Primary Examiner* — Edward M Johnson

(57) ABSTRACT

A method of forming an inorganic oxide coating on a monolith article to produce a coated monolith article suitable for the treatment of an exhaust gas comprises spraying, as a dry particulate aerosol, inorganic particles and a silicone resin to form a coating layer. The present invention also provides an uncalcined porous monolith article for use in forming a monolith article for the treatment of an exhaust gas. The uncalcined monolith article comprises a dry particulate composition comprising inorganic particles and a silicone resin.

18 Claims, 3 Drawing Sheets

METHOD OF FORMING AN INORGANIC OXIDE COATING ON A MONOLITH ARTICLE

FIELD OF THE INVENTION

The present invention relates to a method of forming an inorganic oxide coating on a monolith article. In particular, the coated monolith article is suitable for the treatment of an exhaust gas. More particularly, the method comprises spraying, as a dry particulate aerosol, inorganic particles and a silicone resin to form a coating layer. The present invention also relates to an uncalcined porous monolith article for use in forming a monolith article for the treatment of an exhaust gas. In particular, the uncalcined monolith article comprises a dry particulate composition comprising inorganic particles and a silicone resin.

BACKGROUND OF THE INVENTION

There are concerns about emissions of particulate matter (PM), commonly referred to as soot, from internal combustion engines and especially from diesel and gasoline engines in automotive applications. The main concerns are associated with potential health effects, and in particular with very tiny particles having sizes in the nanometer range.

Diesel particulate filters (DPFs) and gasoline particulate filters (GPFs) have been fabricated using a variety of materials including sintered metal, ceramic or metal fibers etc., with the most common type in actual mass production being the wall-flow kind made from porous ceramic material fabricated in the form of a monolithic array of many small channels running along the length of the body. Alternate channels are plugged at one end so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminum titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 μm and usually about 20 μm. In marked contrast, the size of most diesel particulate matter from a modern passenger car high speed diesel engine is very much smaller, e.g. 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter.

For some filters, for example light duty diesel particulate filters, it is necessary to remove trapped PM periodically from the filter to prevent the build-up of excessive back pressure that is detrimental to engine performance and can cause poor fuel economy. So in diesel applications, retained PM is removed from the filter by burning it in air in a process during which the amount of air available and the amount of excess fuel used to achieve the high temperature needed to ignite the retained PM are very carefully controlled.

Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and or maintain filtration efficiency at all times—for example during the early life of a filter when it is first used, and or during regeneration and immediately afterwards, and or when the filter is loaded with soot.

WO2011/151711 (the entire contents of which is incorporated herein by reference) describes a method of making a filter for filtering particulate matter from exhaust gas emitted from a lean-burn internal combustion engine. The filter comprises a porous substrate having inlet surfaces and outlet surfaces, wherein the inlet surfaces are separated from the outlet surfaces by a porous structure containing pores of a first mean pore size. The inlet surfaces comprise a bridge network comprising interconnected particles of refractory material over the pores of the porous structure. The method comprises the step of contacting inlet surfaces of the filter substrate with an aerosol comprising refractory material in dry powder form.

WO2021/028692 (the entire contents of which is incorporated herein by reference) describes a vehicular exhaust filter comprising a porous substrate having an inlet face and an outlet face, the porous substrate comprising inlet channels extending from the inlet face and outlet channels extending from the outlet face; the inlet channels and the outlet channels being separated by a plurality of filter walls having a porous structure; the vehicular exhaust filter being loaded with a refractory powder having a tapped density before loading of less than 0.10 g/cm$^3$; the vehicular exhaust filter having a mass loading of the refractory powder of less than 10 g/L; and wherein greater than 40% of the refractory powder is located within the porous structure of the plurality of filter walls and less than 60% of the refractory powder is coated on an external surface of the plurality of filter walls. WO2021/028692 also describes suitable methods and apparatus for the spraying of a dry refractory powder, such as a dry particulate aerosol, onto the channels of a porous substrate, preferably wherein greater than 50% of the refractory powder, optionally up to 100% of the refractory powder, may be located with the porous structure of the plurality of filter walls.

WO2020/047708 discloses articles comprising porous bodies, such as porous ceramic honeycomb bodies comprising a material such as a filtration material, for example, a porous inorganic layer disposed on at least a portion of the porous body, and methods for making such articles and porous bodies. The methods comprise contacting an inorganic material in a suspension with a gaseous carrier fluid, the suspensions may be aqueous-based or organic-based, for example, an alcohol such as ethanol or methanol.

The present inventors have found that the porous filter substrates treated with refractory powder materials as described in WO2021/028692 have poor water tolerance and adhesion. For example, porous filter substrates treated with fumed alumina (e.g., Aeroxide® Alu130) have failed to provide the desirable water tolerance for use under certain engine conditions, particularly during successive engine cold starts. As described above, for heavy duty diesel (HDD)

catalytic soot filter (CSF) applications, for example, it is necessary for the filter to be able to withstand several ash cleaning cycles.

The inventors developed the present invention to ameliorate and/or overcome the problems observed in the prior art. The present invention provides an improved method for the production of a more efficient coated monolith article which advantageously demonstrates higher water tolerance and improved filtration efficiencies.

SUMMARY OF THE INVENTION

According to a first aspect of the present invention, there is provided a method of forming an inorganic oxide coating on a monolith article for the treatment of an exhaust gas, the method comprising:

providing a porous monolith article comprising a plurality of channels for the passage of an exhaust gas, each channel having a gas-contacting surface;

spraying onto the gas-contacting surface, as a dry particulate aerosol, inorganic particles and a silicone resin to form a coating layer; and calcining the coating layer to provide a coated monolith article.

In a further aspect, there is provided an uncalcined porous monolith article for use in forming a monolith article for the treatment of an exhaust gas, the monolith article obtainable by a method comprising:

providing a porous monolith article comprising a plurality of channels for the passage of an exhaust gas, each channel having a gas-contacting surface;

spraying onto the gas-contacting surface, as a dry particulate aerosol, inorganic particles and a silicone resin to form a coating layer.

In another aspect, there is provided a coated monolith article for the treatment of an exhaust gas obtainable by the method as described herein in respect of the first aspect. The coated monolith article has enhanced water tolerance over known coated monolith articles and as described herein, the article is preferably a catalytic article and/or a wall-flow filter. Such articles are particularly suited for the treatment of an exhaust gas, particularly the exhaust gas of a vehicle. The inventors have found that the highly cross-linked silicon dioxide present in the coated monolith article is highly effective at binding the inorganic particles to the gas-contacting surface of the channels of the porous monolith article.

In a further aspect of the present invention, there is provided a vehicular exhaust system comprising the coated monolith article.

DETAILED DESCRIPTION OF THE INVENTION

Figure 1:
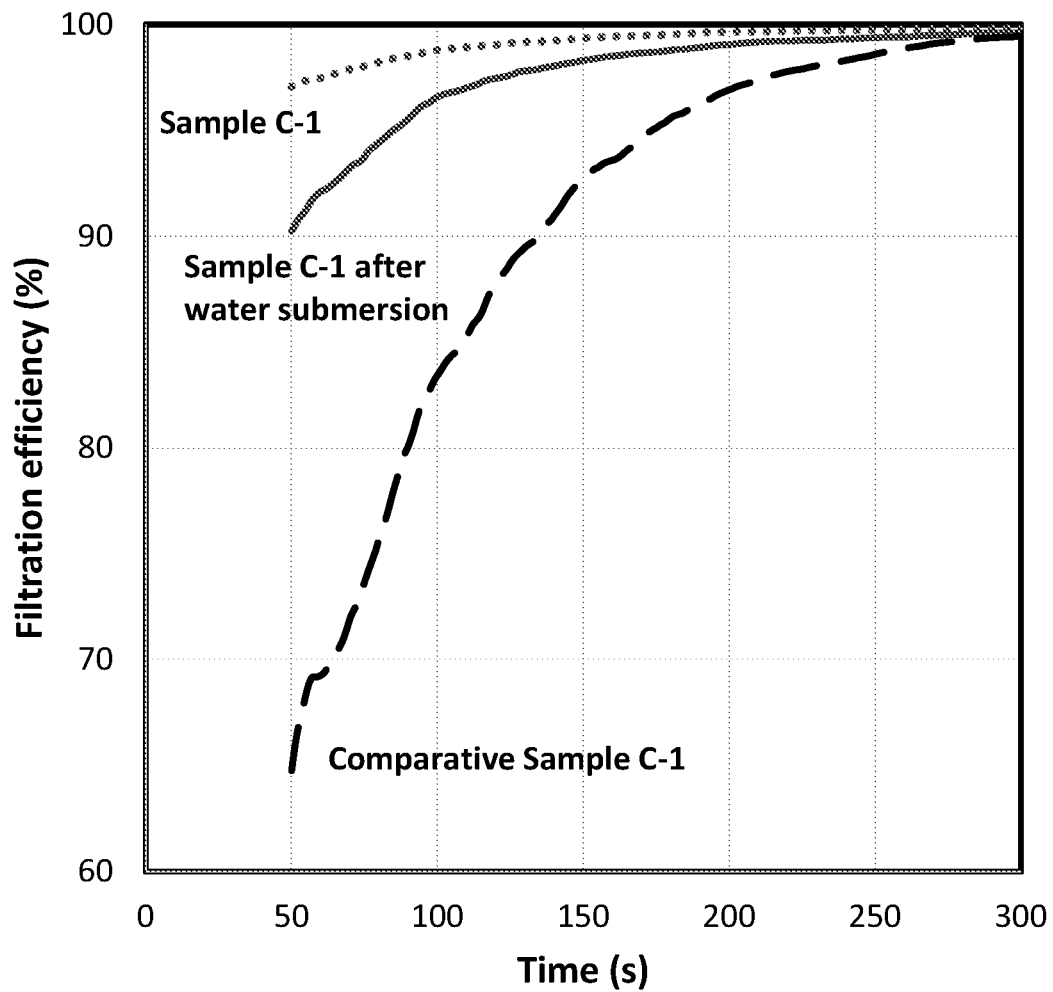
FIG. 1 compares the filtration efficiency data of Comparative Sample C-1, fresh Sample C-1, and Sample C-1 after water submersion treatment.

According to a first aspect of the present invention, there is provided a method of forming an inorganic oxide coating on a monolith article for the treatment of an exhaust gas, the method comprising:

providing a porous monolith article comprising a plurality of channels for the passage of an exhaust gas, each channel having a gas-contacting surface;

spraying onto the gas-contacting surface, as a dry particulate aerosol, inorganic particles and a silicone resin to form a coating layer; and calcining the coating layer to provide a coated monolith article.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The method of the present invention forms an inorganic oxide coating on a monolith article thereby forming a coated monolith article. The monolith article having an inorganic oxide coating is then suitable for use in treating an exhaust gas. An exhaust gas may be a lean-burn exhaust gas, preferably from an engine of a vehicle and the exhaust gas is treated by passing the exhaust gas through the channels of the monolith article thereby contacting the exhaust gas with the gas-contacting surface of the plurality of channels.

The method comprises providing a porous monolith article comprising a plurality of channels for the passage of an exhaust gas, each channel having a gas-contacting surface. Porous monolith articles are well-known in the art. Porous monolith articles may sometimes be referred to as substrates, preferably honeycomb substrates, preferably ceramic honeycomb substrates. Such substrates comprise a plurality of channels which are suitable for the passage of an exhaust gas. The channels are parallel and run from an inlet end (or a first end) to an outlet end (or a second end), i.e., the channels run axially through the article. Typically, the channels have a square cross-section though any known monolith design may be employed.

The porous monolith article/substrate may be formed, for example, from sintered metal, ceramic or metal fibers, etc. For example, the article may be formed from cordierite, various forms of silicon carbide or aluminum titanate.

In some embodiments, the monolith article is a monolith filter. It is particularly preferred that the monolith filter is a wall-flow filter (which may be also be known as a wall-flow monolith article). A wall-flow filter is well-known and typically, adjacent channels are alternatively plugged at each end of the monolith article such that, in use, the exhaust gas passes along an inlet channel (i.e., a channel open at an inlet end of the monolith article for receiving an exhaust gas) and is forced to pass through the channel walls an into an adjacent outlet channel (i.e., a channel open at an outlet end of the monolith article).

The channel walls have a distribution of fine pores providing the monolith article with the required porosity, the average dimensions of the pores in the channel walls, e.g. the filter walls, are typically in the range from 5 to 50 μm. Each channel has a gas-contacting surface. That is, each channel has a surface suitable for contacting, for example, an exhaust gas when in use. The surface may be provided by the channel wall surface and/or by the pores contained therein.

In another particularly preferred embodiment, the porous monolith article is a catalyst article (i.e., a catalytic article). Catalytic porous monolith articles are well-known and exhibit a catalytic function such as oxidation, NOR-trapping, or selective catalytic reduction activity. The porous monolith article may comprise one or more washcoats, preferably catalytic washcoats. A washcoat is a composition that coats and permeates the porous structure of the article. The article comprising said one or more washcoats is preferably then calcined prior to spraying the inorganic particles and silicone resin onto the channels as described herein. The catalyst article can therefore be selected from a three-way catalyst (TWC), NOR absorber, oxidation catalyst, selective reduction catalyst (SCR), hydrocarbon trap and a lean NOR catalyst, for example. The catalyst article may contain one or more platinum group metals, particularly those selected from the group consisting of platinum, palladium, and rhodium.

In a particularly preferred embodiment, the porous monolith article is a catalytic wall-flow filter. Consequently, the article may, for example, be a catalyzed soot filter (CSF), a selective catalytic reduction filter (SCRF), a lean NOR trap filter (LNTF), a gasoline particulate filter (GPF), an ammonia slip catalyst filter (ASCF) or a combination of two or more thereof (e.g., a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

The wall-flow filter may be an asymmetric wall-flow filter. Asymmetric wall-flow filter designs are known, for example, from WO 2005/030365, which discloses a honeycomb filter including an array of interconnecting porous walls which define an array of first channels and second channels. The first channels are bordered on their sides by the second channels and have a larger hydraulic diameter than the second channels. The first channels have a square cross-section, with corners of the first channels having a shape such that the thickness of the porous walls adjoining the corners of the first channels is comparable to the thickness of the porous walls adjoining edges of the first and second channels. In use, the first channels having the larger hydraulic diameter are oriented to the upstream side. Society of Automotive Engineers SAE Technical Paper Series 2007-01-0656 explains that: "There is a pressure drop penalty [for a catalyzed asymmetric cell technology (ACT) wall flow filter] in the clean state for the ACT design due to the contraction and expansion of gases at the filter channel inlet and outlet. However, a filter spends very little time in a totally clean (fully regenerated) state while in operation on a vehicle." WO2005/030365 also explains that the advantages of the asymmetric filter design include increased effective surface area available for collecting soot and ash particles in the inlet portion of the honeycomb filter, thus increasing the overall storage capacity of the honeycomb filter. Common general knowledge textbook "Catalytic Air Pollution Control—Commercial Technology", 3rd Edition, Ronald M. Heck et al, John Wiley & Sons, Inc. Hoboken, N.J., USA (2009) pp. 338-340 explains that: "Such a [asymmetric filter] channel design enables higher ash storage capacity combined with lower ash-loaded back pressure due to larger hydraulic diameter and higher open volume at inlet. The ACT design also helps preserve the mechanical and thermal durability of the filter".

The method further comprises spraying onto the gas-contacting surface, as a dry particulate aerosol, inorganic particles and a silicone resin to form a coating layer. The method therefore comprises spraying a dry powder (i.e., dry particles) suspended in a gas (i.e., as an aerosol) onto the gas-contacting surface of the plurality of channels on the monolith article. The spraying of dry powders onto monolith articles is known in the art. Suitable methods and apparatus are described in, for example, WO2011/151711 and WO2021/028692.

The present inventors have surprisingly identified that by including a silicone resin in the dry powder for forming a dry particle aerosol, the resulting article exhibits remarkably improved water tolerance and aids in the adhesion of the inorganic particles to the surfaces of the channels walls. The improved retention of the inorganic particles was found to improve the filtration efficiency of the article, such that monolith filter articles are particularly preferred embodiments for utilising the benefits from including a silicone resin.

One major advantage of the present invention is that the monolith articles, such as filters that contain catalyst in the filter walls, can be treated after a catalyst is supported on the filter and so that the inorganic coating does not interfere with the catalyst in and/or on the filter walls. Moreover, the inventors have found that a silicone resin as described herein does not require high temperature processing that might be detrimental to the catalyst enabling the inorganic particles to be more effectively retained and adhered to the article channels.

Silicone resins are known and are branched, cage-like oligosiloxanes and polysiloxanes. The branching in silicone resins results from the presence of so called "T" and/or "Q" units in the resin which refer to $RSiO_3$ and $SiO_4$ units (R is an alkyl or aryl group), respectively, wherein further silicon units are bonded to the oxygen atoms. "M" units, i.e., $R_3SiO$ unit are terminal units wherein the oxygen atom provides a link to the resin backbone. Similarly, "D" units, i.e., $R_2SiO_2$ units provide linear connectivity across the two oxygen atoms. One well known non-branched and linear polysiloxane is polydimethylsiloxane (PDMS; i.e., $(Me_2SiO)_n$).

As will be appreciated, the requirement for the inorganic particles and the silicone resin to be sprayed as a dry particulate aerosol requires that the silicone resin is one which is a solid particulate. Accordingly, the silicon resin may be referred to herein as silicone resin particles. Preferably, the silicon resin is a solid at room temperature (e.g., about 25° C.). Accordingly, the silicone resin preferably has a melting point of greater than 25° C., preferably greater than 30° C., more preferably greater than 35° C. Preferably, the melting point of the silicone resin is less than 100° C., preferably less than 95° C., less than 90° C., less than 85° C. or less than 80° C. Non-branched polysiloxanes such as PDMS typically have lower melting points than silicone resins which are branched. For example, the melting point of PDMS is about −40° C. WO 2011/151711 discloses binding powder in place by treatment with polydimethylsiloxane which forms silica when hydrolysed at sufficiently high temperature.

Similarly, the inventors have found that it is preferable that the silicone resin has a glass transition temperature (Tg) of greater than 30° C., preferably greater than 35° C., and/or less than 100° C., preferably less than 80° C. Without wishing to be bound by theory, the inventors believe that silicone resins which have such melting points and/or glass transition temperatures are particularly suited for the powder coating process, i.e., for effective particulate dispersion across on the monolith article together with the inorganic particles, yet low enough to permit low temperature calcination thereby effectively and efficiently adhering the inorganic particles to the gas-contacting surface of the channel walls.

Preferably, the inorganic particles are selected from the group consisting of zeolites, refractory oxides, and their mixtures. Examples of suitable zeolites include silicate zeolite, aluminosilicate zeolite, metal-substituted aluminosilicate zeolite, AlPO, MeAlPO, SAPO, MeAPSO, and the like. In some embodiments, the first and second zeolites are independently selected from aluminosilicate, borosilicate, gallosilicate, SAPO, AlPO, MeAPSO, and MeAPO zeolites. In some embodiments, the zeolite has a framework type selected from ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, WI, VNI, VSV, WIE, WEN, YUG, ZON, or combinations thereof. In some embodiments, the zeolite has a framework type selected from AEI, AFT, AFV, AFX, AVL, BEA, CHA, DDR, EAB, EEI, ERI, FAU, FER, IFY, IRN, KFI, LEV, LTA, LTN, MER, MOR, MWF, MFI, NPT, PAU, RHO, RIE, RTH, SAS, SAT, SAV, SFW, TSC, and UFI.

In another preferred embodiment, the inorganic particles are refractory oxide particles which can be based on an oxide selected from the group consisting of alumina, silica, zirconia, ceria, chromia, magnesia, calcia, titania and mixed oxides of any two or more thereof. Preferably, the refractory oxide particles comprise calcium aluminate, fumed alumina, fumed silica, fumed titania, fumed zirconia, fumed ceria, alumina aerogel, silica aerogel, titania aerogel, zirconia aerogel, ceria aerogel or a mixture thereof. The one or more fumed refractory powders (refractory oxide particles) may be produced by a pyrogenic process, for example flame pyrolysis.

One example of inorganic particle is silicic acid.

Preferably, the inorganic particles and/or silicone resin particles have a $d_{50}$ by volume of greater than 0.2 μm, preferably greater than 0.5 μm, and/or less than 50 μm, preferably less than 25 μm, preferably less than 20 μm, preferably less than 15 μm, preferably less than 10 μm.

Preferably, the dry particulate aerosol is formed from a dry particulate composition having a tapped density of less than 1.5 g/cm$^3$. The dry particulate composition may be referred to as a dry particulate powder. The dry particulate composition preferably consists of the inorganic particles and/or silicone resin. In some preferred embodiments, the inorganic particles have a tapped density of less than 0.1 g/cm$^3$ (typically for fumed refractory oxides). In other preferred embodiments, the inorganic particles have a tapped density of greater than 0.1 g/cm$^3$, preferably greater than 0.2 g/cm$^3$. For example, zeolite particles such as Cu-substituted zeolite may preferably have a tapped density of about 0.25 g/cm$^3$. In other preferred embodiments, the inorganic particles, such as refractory oxide particles, may have a tapped density of less than 1.4 g/cm$^3$, preferably less than 1.3 g/cm$^3$, preferably less than 1.2 g/cm$^3$. By way of example only, calcium aluminate may have a tapped density of about 1 g/cm$^3$. Accordingly, the inorganic particles may preferably have a tapped density of from 0.1 g/cm$^3$ to 1.4 g/cm$^3$, preferably from 0.2 g/cm$^3$ to 1.2 g/cm$^3$. The silicon resin particles may have a tapped density of from 0.3 g/cm$^3$ to 0.9 g/cm$^3$, preferably from 0.5 g/cm$^3$ to 0.7 g/cm$^3$. The dry particulate composition consisting of a mixture of the inorganic particles and silicone resin may preferably have the same tapped densities as described for either of the inorganic particles or silicone resin individually. In some preferred embodiments, the tapped density of the dry particulate composition is from 0.5 to 1.4 g/cm$^3$, preferably from 0.7 g/cm$^3$ to 1.2 g/cm$^3$.

In one preferred embodiment, the spraying step comprises a first spraying step wherein the inorganic particles are sprayed onto the gas-contacting surface as a first dry particulate aerosol to form an inorganic particle layer and in a second spraying step the silicone resin is then sprayed onto the inorganic particle layer as a second dry particulate aerosol to form the coating layer. Accordingly, the inorganic particles are sprayed onto the channels of the monolith article before the silicon resin is separately sprayed on the channel coated with the inorganic particles.

Even more preferably, a mixture of the inorganic particles and silicone resin is sprayed onto the gas-contacting surface as a dry particulate aerosol to form the coating layer. Accordingly, an intimate mixture of the inorganic particles and silicone resin is coated onto the gas-contacting surface of the channels and provides enhanced adhesion of the inorganic particles to the channel walls upon calcination of the silicone resin.

Where a mixture of the inorganic particles and silicone resin is sprayed onto the gas-contacting surface as a dry particulate aerosol to form the coating layer (preferably wherein the dry particulate composition consists of the inorganic particles and silicone resin), in the mixture, the ratio of inorganic particles to silicone resin, by weight, is preferably greater than 0.5 (in other words greater than 0.5:1), preferably greater than 0.7, preferably greater than 0.9, and/or less than 4, preferably less than 3, preferably less than 2.5. For example, the ratio may preferably be about 1 or about 2. Preferably, the ratio is from 0.5 to 4, preferably from 0.7 to 3, preferably from 0.9 to 2.5, preferably from 1 to 2.

Preferably, the silicone resin has a molecular weight of greater than 1,000, preferably greater than 2,000, preferably greater than 5,000, preferably greater than 10,000, and/or a molecular weight of less than 500,000, preferably less than 200,000.

As used herein, molecular weight refers to the weight average molecular weight (Mw) which may be measured using any conventional means in the art. In some embodiments, particularly those described herein wherein the silicone resin comprises hydroxy functionalities, the molecular weight may be relatively low since the hydrogen bonding provided by the hydroxy functionalities provides the silicone resin with a sufficiently high melting point and/or glass transition temperature. Accordingly, in some embodiments the molecular weight of the silicon resin may be from 1,000 to 10,000, preferably from 1,000 to 5,000, preferably from 1,200 to 3,500, such as from 1,500 to 2,000. Silicone resins having molecular weights below 1,000 are less preferred since they are typically either liquid and not suitable for dry spraying or do not have as much branching as larger molecules which is believed to provide enhanced binding of the inorganic particles to the monolith article.

Nevertheless, the molecular weight of the silicone resin may preferably be from 15,000 to 150,000, preferably from 20,000 to 120,000, preferably from 60,000 to 100,000. Some preferable resins have an Mw of from 8,000 to 15,000, some from 20,000 to 60,000 and others from 80,000 to 120,000.

It is particularly preferred that the silicone resin has the formula $[R_xSiX_yO_z]_n$, wherein R is an alkyl or aryl group, X is a functional group bonded to silicon, and wherein z is more than 1 and less than 2. As will be appreciated, n is large so as to provide an oligomer or polymer necessary for a silicone resin, particularly a resin which is solid at room temperature. Whilst dependent on the molecular mass of the R and X groups, an Mw of greater than 1,000 may be achieved where n is greater than 10, an Mw of greater than 10,000 may be achieved where n is greater than 100 and an Mw of greater than 100,000 may be achieved where n is greater than 1,000. Accordingly, n may preferably be greater than 10, greater than 100, greater than 1,000.

As will be appreciated, R is an alkyl or an aryl bonded to silicon and X is a non-hydrocarbon functional group bonded to silicon. Equally, since silicon is a tetravalent atom, it will be appreciated that $x+y+2z=4$. z is less than 2 since where $z=2$, x and $y=0$ providing silica (i.e., silicon dioxide; $(SiO_2)_n$). Similarly, z is greater than 1 since where $z=1$, $x+y=2$ providing a substituted polysiloxane (e.g. $(RXSiO)_n$) consisting of "D" units providing a linear resin (e.g. —O—(SiRX)—O—(SiRX)—O—). One example is polydimethylsiloxane. Accordingly, O refers to oxygen bridging two silicon atoms in the polymeric backbone of the silicone resin.

Preferably, $0<x+y<2$, preferably $0<x+y\leq1.5$, preferably $0<x+y\leq1$. Preferably, x, y and/or x+y is greater than 0.1, preferably greater than 0.2. In one preferred embodiment, x+y is 1 providing a silicone resin known generally as a polysilsesquioxane. Preferably, y is less than 1 and/or y is less than x. Even more preferably, $2y\leq x$, preferably $5y\leq x$, preferably $10y\leq x$. In one embodiment, y is 0. For example, y is 0 where the polysilsesquioxane is a polyalkylsilsesquioxane such as polymethylsilsesquioxane $(MeSiO_{3/2})_n$.

Typically, where present, X is one or more of H, hydroxy (OH), Cl and $C_1$-$C_6$ alkoxy, preferably one or more of OH and $C_1$-$C_6$ alkoxy, preferably wherein the $C_1$-$C_6$ alkoxy is selected from methoxy ($OCH_3$) and ethoxy ($OCH_2CH_3$). In a particularly preferred embodiment, X is one or both of OH and ethoxy. However, X is a functional group which can also be a reactive functional group such as aminyl ($NH_2$, $NR_2$), epoxy, acrylate, and vinyl, though these are less preferred since the presence of hydroxy or alkoxy groups is believed to provide more effective cross-linking during calcination. As described above, any oxygen present in the terminal functional group does not contribute to "$O_z$" in the above formula which refers to silicon bridging oxygen atoms.

The inventors have found that the silicone resins described herein provide a coated monolith article with the advantageous benefit of enhanced water tolerance. The silicone resin has been found to be particularly advantageous in binding the inorganic particles to the monolith article. Without wishing to be bound by theory, the inventors believe that the branched structure and the physical properties of the silicone resin permit the resin, during the calcination step as described herein, to first melt and begin to cure after having been combined with the inorganic particles on the gas-contacting surface of the channels (either intimately or deposited thereon). As the resin cures, the resin forms additional —Si—O—Si—O—Si— bridges/bonds further increasing its branch-like structure. Additionally, the inventors believe that such bonds may also be formed with the gas-contacting surface (i.e., the monolith article itself) along with the inorganic particles further cementing the particles in place in the article, for example by forming —Si—O—Al— bonds. As the temperature during calcination continues to increase, the R and X groups are oxidised to leave a silica ($SiO_2$) framework. Accordingly, silicon and/or aluminium containing inorganic particles may be preferred, for example, zeolites, calcium aluminate, alumina and/or silica.

Preferably, the silicone resin has a degree of crosslinking of greater than 55%, preferably greater than 60%, more preferably greater than 65%, and/or a degree of crosslinking of less than 85%, preferably less than 80%.

As described herein, the silicon atom(s) of a silicone resin, such as that described by the formula $[R_xSiX_yO_z]n$, may be in one of four coordination environments in view of the tetravalent nature of silicon, i.e., $SiO(R/X)_3$, $SiO_2(R/X)_2$, $SiO_3(R/X)$ or $SiO_4$ known in the art as "M", "D", "T", and "Q", respectively. Accordingly, the above formula may be described by aMbDcTdQ where $a+b+c+d=1$ and the degree of crosslinking is defined by $[(a+2b+3c+4d)/4]*100$. The relative ratios of the number of silicon atoms in each coordination environment may be determined using standard spectroscopic techniques, for example, multi-nuclear NMR spectroscopy, particularly $^{29}Si$ NMR spectroscopy. Alternatively, for commercially available silicone resins, the degree of crosslinking may be provided in the technical datasheet.

In other words, silicon dioxide ($SiO_2$) is formed entirely of "Q" $SiO_4$ units where each silicon atom is bonded to four connecting oxygen atoms. Accordingly, where d is 1, this gives silicon dioxide a 100% degree of crosslinking. On the other hand, by way of example, PDMS is formed entirely of "D" $Si(Me)_2O_2$. Accordingly, where b is 1, this gives polydimethylsiloxane a 50% degree of crosslinking. Consequently, silicone resins preferably have a degree of crosslinking between these two extremes and comprise a mixture of such units. Accordingly, a silicone resin may preferably consist of MDT units, MTQ units, DTQ units or DT units.

Preferably, R is one or more of $C_1$-$C_6$ alkyl or phenyl group. Due to the oligomeric or polymeric nature of a silicone resin, the number of monomeric units is typically large. There may be numerous instances of both R and X groups such that the silicon resin, as described by a single monomeric unit, may comprise multiple different groups. As described above with regards to the functional group X, X may preferably be both OH and ethoxy. Similarly, R may comprise more than one $C_1$-$C_6$ alkyl and/or phenyl. Accordingly, where R is described by more than one group such as R' and R", the formula of the silicon resin may be $[R'_{x'}R''_{x''}SiX_yO_z]_n$ wherein $x'+x''=x$. This applies equally to the functional group X.

Preferably, R is one or more of a straight chain or branched alkyl and phenyl, one or more of a straight chain alkyl and phenyl, more preferably one or both of methyl and phenyl. In some preferred embodiments wherein R is both methyl and phenyl, the phenyl to methyl ratio is less than 2, preferably less than 1.5, preferably less than 1, preferably less than 0.5. In some embodiments, R is phenyl. More preferably, R is methyl (i.e., the ratio is 0).

Smaller organic groups such as methyl, methoxy and ethoxy for the R and X groups are particularly preferred since this increases the $SiO_2$ content of the starting silicone resin reducing the weight loss during calcination. Additionally, there is reduced smoking during calcination and loss of volatiles (such as $H_2O$, $CO_2$ and other volatile organics).

Accordingly, it is preferred that the silicon dioxide content of the silicone resin is greater than 50 wt %, preferably greater than 60 wt %, preferably greater than 70 wt %, preferably greater than 80 wt %. The silicon dioxide content may also be referred to as the ash content which is the weight of the product remaining after complete oxidation (in this case the product being silicon dioxide) by weight of the starting silicone resin. For example, the oxidation may be carried out at 1000° C. Alternatively, the silicon dioxide content may be available from the technical datasheet of suitable commercially available silicone resins. Alternatively, the silicon dioxide content may be calculated on the basis of complete oxidation of silicon to silicon dioxide and the resin chemical formula. By way of example only, polymethylsilsesquioxane $(MeSiO_{3/2})_n$ is about 42.7 wt % silicon, by weight of the silicone resin based on a formula weight of 66.1 and silicon's atomic weight of 28.1. Silicon dioxide has a formula weight of 60.1 which is about 2.1 times greater than that of silicon. Accordingly, the silicon dioxide content of polymethylsilsesquioxane is 2.1*42.7=89.7 wt % (i.e., by weight of the silicone resin).

One particularly preferred silicone resin for use in the method of the present invention is a highly cross-linked ethoxylated poly(dimethyl siloxane) having silicon dioxide content of about 82 wt %, and a melting point of from 35° C. to 55° C.

The method further comprises calcining the coating layer to provide a coated monolith article. That is, the method comprises calcining the porous monolithic article having the inorganic particles and silicone resin sprayed thereon on the gas-contacting surfaces of the plurality of channels.

Preferably, the step of calcining comprises heating to a temperature of at least 200° C., preferably at least 300° C., more preferably at least 400° C., and/or a temperature of at most 600° C., preferably at most 550° C., more preferably at most 530° C. Accordingly, calcining preferable comprises heating to a temperature of from 200° C. to 600° C., preferably from 300° C. to 550° C., preferably from 400° C. to 530° C., more preferably from 400° C. to 500° C., even more preferably from 400° C. to 450° C.

Such temperatures have been found as most suitable for forming an effective binder which provides the coated monolith article with its advantageous water tolerance. Such temperatures are particularly advantageous when the porous monolith article is a catalyst article, such as a catalytic wall-flow filter, since these temperature allow for calcination of the silicone resin into a cross-linked silicon dioxide without negatively impacting the catalytic efficiency (i.e., without degrading the catalyst article). It is believed that linear siloxanes such as PDMS, not only do not provide the required branching to effectively bind the inorganic particles and adhere to the article, complete degradation to $SiO_2$ requires temperatures in excess of 550° C. or even 600° C. Ideally, calcination temperatures are kept as low as possible to reduce the likelihood of affecting catalytic activity of any catalyst present in the monolithic article.

In a further aspect of the present invention, there is provided an uncalcined porous monolith article for use in forming a monolith article for the treatment of an exhaust gas, the uncalcined porous monolith article comprising a plurality of channels and comprising a dry particulate composition comprising inorganic particles and a silicone resin, the dry particulate composition being located within the channels and/or pores of said uncalcined porous monolith.

Thus, the uncalcined porous monolith article is suitable for use in forming a monolith article which may be used for the treatment of an exhaust gas. Preferably, the uncalcined porous monolith article is for use in forming a monolith article, preferably wherein the monolith article is to be used for the treatment of an exhaust gas. The uncalcined porous monolith article comprises a plurality of channels and comprises a dry particulate composition comprising inorganic particles and a silicone resin, as described herein in respect of the first aspect. The dry particulate composition is located within the channels and/or pores of the uncalcined porous monolith, that is, the composition coats a gas-contacting surface of the channels.

The uncalcined porous monolith article comprising the dry particulate composition may be formed into a monolith article by calcination thereby decomposing the silicone resin of the dry particulate composition into silicon dioxide, preferably by heating to a temperature as described herein.

Preferably, the mass loading of the dry particulate composition is less than 50 g/L, preferably less than 30 g/L. Preferably, the mass loading of the inorganic particles is at least 5 g/L and/or less than 25 g/L. Preferably, the mass loading of the silicone resin is at least 5 g/L and/or less than 25 g/L. In one preferred embodiment, the mass loading of the inorganic particles is from 5 g/L to 15 g/L and/or the mass loading of the silicone resin is from 5 g/L to 15 g/L. By way of example, where the ratio of inorganic particles to silicone resin, by weight, is 1:1, the loading of inorganic particles may be 10 g/L and the loading of the silicone resin may be 10 g/L giving a total loading of the dry particulate composition of 20 g/L. By way of example, where the ratio is 2:1, the inorganic particle loading may be 10 g/L and the silicone resin loading 5 g/L giving a total loading of 15 g/L.

In a further aspect, there is provided an uncalcined porous monolith article for use in forming a monolith article for the treatment of an exhaust gas, the monolith article obtainable by a method comprising:

providing a porous monolith article comprising a plurality of channels for the passage of an exhaust gas, each channel having a gas-contacting surface;

spraying onto the gas-contacting surface, as a dry particulate aerosol, inorganic particles and a silicone resin to form a coating layer.

In another aspect, there is provided a coated monolith article for the treatment of an exhaust gas obtainable by the method as described herein in respect of the first aspect. The coated monolith article has enhanced water tolerance over known coated monolith articles and as described herein, the article is preferably a catalytic article and/or a wall-flow filter. Such articles are particularly suited for the treatment of an exhaust gas, particularly the exhaust gas of a vehicle. The inventors have found that the highly cross-linked silicon dioxide present in the coated monolith article is highly effective at binding the inorganic particles to the gas-contacting surface of the channels of the porous monolith article.

In a further aspect of the present invention, there is provided a vehicular exhaust system comprising the coated monolith article.

Example A

Comparative Sample A-1

A GPF filter having a 50 g/L washcoat loading was prepared from a cordierite substrate, 300/8, 1.3 L type by following the procedure of Example 1 of US20200306692A1.

Comparative Sample A-2

A GPF filter is prepared in the same way as Comparative Sample A-1.

The GPF filter prepared was then loaded with 0.5 g/L fumed alumina powder ($d_{50}$=6 μm, $d_{90}$=12 μm) using the following the method and apparatus described in WO 2021/028692. The diameter of the flow conduit was the same as the inlet face of the filter. A primary gas flow of 550 m³/h of air was pulled through the filter using a downstream regenerative blower. Back pressure was monitored with a Wika® P30 pressure transmitter located below the filter. The refractory powder was dispersed into the primary gas flow using a STAR Professional gravity feed spray gun 1.4 mm part no. STA2591100C. The 15 STAR Professional gravity feed spray gun was mounted 100 mm from the inlet face of the filter. The back pressure was used to determine the point of stopping of spraying of the refractory powder. After loading was completed the filter was calcined at 500° C. for 1 h.

Sample A-1

Sample A-1 was prepared in the same way as Comparative Sample A-2, except that it is loaded with a mixture of a chabazite zeolite powder ($d_{50}$=2.4 μm, $d_{50}$=4.1 μm) and a highly cross-linked ethoxylated poly(dimethyl siloxane) powder (silicon dioxide content of 82 wt %, melting point of from 35° C. to 55° C., $d_{50}$=34 μm, $d_{50}$=115 μm) at a weight ratio of 2:1. The powder loading was 8 g/L prior to calcination.

Sample A-2

A GPF filter having a 100 g/L washcoat loading was prepared from a cordierite substrate, 300/8, 1.3 L type by following the procedure of Example 1 of US20200306692A1.

Sample A-2 was prepared by loading with a mixture of calcium aluminate powder ($d_{50}$=53 μm, $d_{50}$=118 μm) and a highly cross-linked ethoxylated poly(dimethyl siloxane) powder (silicon dioxide content of 82 wt %, melting point of from 35° C. to 55° C., $d_{50}$=34 μm, $d_{50}$=115 μm) at a weight ratio of 1:1 by following the loading procedure of Comparative Sample A-2. The powder loading was 13.8 g/L prior to calcination.

Sample A-3

Sample A-3 was prepared in the same way as Comparative Sample A-2, except that it is loaded with a mixture of a beta zeolite powder ($d_{50}$=6.4 μm, $d_{50}$=41 μm) and a highly cross-linked ethoxylated poly(dimethyl siloxane) powder (silicon dioxide content of 82 wt %, melting point of from 35° C. to 55° C., $d_{50}$=34 nm, $d_{90}$=115 μm) at a weight ratio of 1:1. The powder loading was 20.7 g/L prior to calcination.

Filtration Test

Samples were tested on an engine bench on an RDE cycle for filtration efficiency, both fresh and after a set of cold start idle testing, where the filter sample was subjected to 50 repeated cold start/idles where water is accumulated on the filter. The test results are listed in Table 1. The filtration efficiency in Table 1 is the soot particulates removed over the entire drive cycle.

TABLE 1

| Sample | Washcoat loading (g/L) | Powder | Powder loading (g/L) | Fresh engine filtration efficiency (%) | 50x cold start engine filtration efficiency (%) |
|---|---|---|---|---|---|
| Comparative A-1 | 50 | None | | 69.4 | 72.5 |
| Comparative A-2 | 50 | fumed alumina | 0.5 | 98.1 | 83.2 |
| A-1 | 50 | chabazite zeolite silicone resin | 8 | 95.6 | 89.5 |
| A-2 | 100 | calcium aluminate silicone resin | 13.8 | 93.9 | 88.1 |
| A-3 | 100 | beta zeolite silicone resin | 20.7 | 95.9 | 84.8 |

The results show much lower reduction in filtration efficiency from fresh to 50× cold starts for Samples A-1, A-2 and A-3 as compared to Comparative Sample A-2.

Example B

Comparative Sample B-1

A SCRF filter having a 116 g/L washcoat loading was prepared from a silicon carbide (SiC) substrate, NGK MSC-18 300/12, 3 L type by following the procedure of Example 1 of U.S. Pat. No. 8,789,356. The washcoat contains a copper loaded AEI zeolite from Valiant, zirconium acetate and an alumina binder (weight ratio of zeolite to alumina=90:10, zirconium=40 g/ft³). The inlet coating length is about 20% of the substrate length; the outlet coating length is about 80% of the substrate length. The coated filter was dried at 110° C. and calcined at 500° C. for 1 h.

Comparative Sample B-2

A SCRF filter is prepared in the same way as Comparative Sample B-1. The SCRF filter prepared was then loaded with a fumed alumina powder ($d_{50}$=6 μm, $d_{90}$=12 μm) using the method and apparatus of WO 2021/028692. The diameter of the flow conduit was the same as the inlet face of the filter. A primary gas flow of 300 m³/h of air was pulled through the filter using a downstream regenerative blower. Back pressure was monitored with a Wika® P30 pressure transmitter located below the filter. The powder was dispersed into the primary gas flow using a STAR Professional gravity feed spray gun 1.4 mm part no. STA2591100C. The 15 STAR Professional gravity feed spray gun was mounted 100 mm from the inlet face of the filter. The back pressure parameter was used to determine the point of stopping of spraying of the refractory powder. The powder loading amount was 4 g/L prior to calcination. After loading was completed the filter was calcined at 500° C. for 1 h.

Sample B-1

Sample B-1 was prepared in the same way as Comparative Sample B-2, except that it is loaded with a mixture of a spray dried Cu-chabazite (3.3 wt % Cu, $d_{90}$=10-12 μm) and a highly cross-linked ethoxylated poly(dimethyl siloxane) powder (silicon dioxide content of 82 wt %, melting point of from 35° C. to 55° C., $d_{50}$=34 nm, $d_{90}$=115 μm) at a weight ratio of 1:1. The powder loading was 15 g/L prior to calcination.

Sample B-2

Sample B-2 was prepared in a similar way as Comparative Sample B-2. It was loaded with 15 g/L of a mixture of a spray dried Cu-chabazite (3.3 wt % Cu, $d_{90}$=10-12 μm) and a highly cross-linked ethoxylated poly(dimethyl siloxane) powder (silicon dioxide content of 82 wt %, melting point of from 35° C. to 55° C., $d_{50}$=34 nm, $d_{90}$=115 μm) at a weight ratio of 1:1, placed in an oven at 110° C. for 15 min, then cooled to room temperature. It was then loaded with 5 g/L of a mixture of a chabazite zeolite ($d_{90}$=4.9 nm) and the same silicone resin powder at a weight ratio of 1:1. The total powder loading was 20 g/L prior to calcination.

Filtration Efficiency

Filter samples were tested using a Cambustion® Diesel Particulate Filter Testing System available from Cambustion Ltd. of Cambridge, UK with the following test conditions:
 a) Stabilisation—250 kg/h mass flow, 50° C., 5 mins
 b) Warm up—250 kg/h mass flow, 240° C., 5 mins
 c) Weighing—filter removed from rig and weighed
 d) Warm up—filter returned to rig; 250 kg/h mass flow, 240° C., 5 mins
 e) Loading Phase—250 kg/h mass flow, 240° C., loading rate: 2 g/h until 2 g/L soot load
 f) Weighing—filter removed from rig and weighed.

The fuel used during the test is: Carcal RF-06-08 B5.

During the test, the particle counter continuously samples downstream of the filter. Immediately before and after a batch of filters are tested, an "Upstream" test is run on the rig to allow the particle counter to sample the raw soot production from the rig. The Upstream test is 20 minutes long and uses the same conditions as the Loading Phase above. Comparing the average of the two Upstream tests (before and after filter testing) with the data from the Loading phase of the filter test gives the filtration efficiency.

Filter samples, both fresh and after a water soaking treatment. In the water soaking treatment, the filter was submerged in water for 30 s before being dried at 110° C. for 0.5 h.

The filtration efficiency data collected 50 s after the start of the tests are summarized in Table 2. The results show Samples B-1 and B-2, which are prepared by loading a mixture of zeolite powder and the silicone resin gave much improved tolerance to water as compared to Comparative Sample 2.

TABLE 2

| Sample | Powder used | Fresh DPG filtration efficiency (%) | DPG filtration efficiency after water soaking (%) |
|---|---|---|---|
| Comparative B-1 | None | 50 | 50 |
| Comparative B-2 | fumed alumina | >99 | 50 |
| B-1 | Cu-chabazite silicone resin | 82 | 80 |
| B-2 | Cu-chabazite chabazite silicone resin | 99 | 95 |

Example C

Comparative Sample C-1

A CSF filter was prepared from a silicon carbide filter substrate, 300/6, 2.44 L type. The substrate was washcoated with a CSF catalyst composition with alumina support with a PGM loading of 3 g/ft³ and a Pt:Pd weight ratio of 2:1 and a washcoat loading of 0.2 g/in³.

Sample C-1

A CSF filter was prepared in the same way as Comparative Sample C-1.

A mixture of alumina ($d_{50}$=30 μm, density=200 g/L) and a highly cross-linked ethoxylated poly(dimethyl siloxane) powder (silicon dioxide content of 82 wt %, melting point of from 35° C. to 55° C., $d_{50}$=34 μm, $d_{50}$=115 μm) in a weight ratio 1:1 was applied to the CSF filter using the method and apparatus described in WO 2021/028692. The diameter of the flow conduit was the same as the inlet face of the filter. The mixed powder was applied under continuous vacuum creating an airflow of approximately 13 m/s. Back pressure was monitored with a Wika® P30 pressure transmitter located below the filter. The powder was dispersed into the primary gas flow using a STAR Professional gravity feed spray gun 1.4 mm part no. STA2591100C. The 15 STAR Professional gravity feed spray gun was mounted 100 mm from the inlet face of the filter. The back pressure was used to determine the point of stopping of spraying of the refractory powder. The filter was loaded with 20 g/L powder. The filter prepared was then calcined in air at 500° C. for 1 h.

Sample C-2

Sample C-2 was prepared in the same way as Sample C-1, except that a mixture of a boehmite ($d_{50}$=30 μm, density=500 g/L) and a highly cross-linked ethoxylated poly (dimethyl siloxane) powder (silicon dioxide content of 82 wt %, a melting point of from 35° C. to 55° C., $d_{50}$=34 μm, $d_{90}$=115 μm) at a weight ratio of 1:1 was applied to the filter. The filter was loaded with 20 g/L of powder. The filter thus prepared was then calcined in air at 500° C. for 1 h.

Sample C-3

Sample C-3 was prepared in the same way as Sample C-1.

Sample C-4

Sample C-4 was prepared in the same way as Sample C-2.

Sample C-5

Sample C-5 was prepared in the same way as Sample C-1, except that a mixture of silicic acid (80 mesh) and a highly cross-linked ethoxylated poly(dimethyl siloxane) powder (silicon dioxide content of 82 wt %, melting point of from 35° C. to 55° C., $d_{50}$=34 μm, $d_{50}$=115 μm) at a weight ratio of 1:1 was applied to the filter. The filter was loaded with 20 g/L of powder. The filter thus prepared was then calcined in air at 500° C. for 1 h.

Back Pressure

Samples C-1 and C-2 were fully submerged in a container of around 6 L of deionised water for approximately 10 s before removal from the water, shaking of the part to remove excess water and drying in an oven at 115° C. for around 45 min.

Cold flow back pressure tests were carried out with Sample C-1 and Sample C-2 before and after water submersion treatment at a flow rate of 600 m³/h. The test results are shown in Table 3.

TABLE 3

| Sample | Powders used | Initial CFBP (mbar) | CFBP after submersion in water (mbar) |
|---|---|---|---|
| C-1 | alumina silicone resin | 50.1 | 49.6 |
| C-2 | boehmite silicone resin | 53.3 | 51.2 |

Table 3 shows that water submission caused only a slight change to the back pressure of Samples C1 and C-2.

Filtration Efficiency

Filtration testing was carried out using a commercially available Cambustion diesel particulate generator (DPG) rig using an upstream PN baseline, followed by downstream post-CSF measurements during testing, as described in EXAMPLE B, enabling a filtration efficiency to be calculated for each example.

FIG. 1 compares the filtration efficiency data of Comparative Sample C-1, fresh Sample C-1, and Sample C-1 after water submersion treatment.

Figure 2:
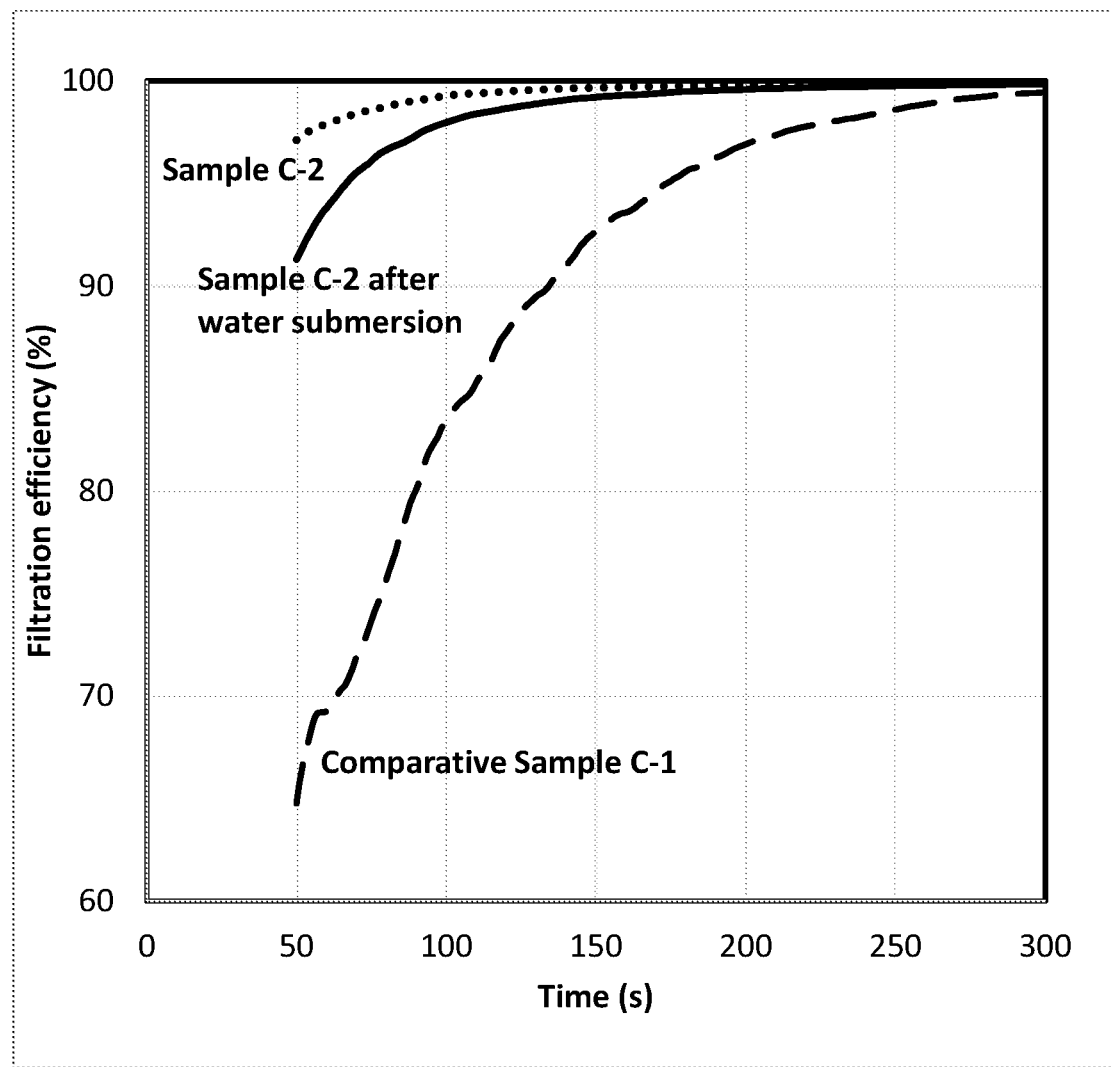
FIG. 2 compares the filtration efficiency data of Comparative Sample C-1, fresh Sample C-2, and Sample C-2 after water submersion treatment.

FIG. 2 compares the filtration efficiency data of Comparative Sample C-1, fresh Sample C-2, and Sample C-2 after water submersion treatment.

FIGS. 1 and 2 show that much higher filtration efficiency was achieved by addition of the refractory oxide powder to the CSF filter. Only a slight decrease in filtration efficiency was observed after Sample C-1 and Sample C-2 were submersed in water.

Gas Attrition Test

Gas attrition tests were performed with Sample C-3, Sample C-4, and Sample C-5 using a high pressure air nozzle operating with a flow rate of 425 L/min, at a distance of 0.5 inch from the face of the filter, moving across the face surface of the filter at 6.7 mm/s in a zigzag pattern to move across the whole face of the filter. The attrition treatment was performed from both the inlet and outlet faces of the filter. Samples were weighed after they were dried in an oven at 115° C. for 30 minutes before and after the attrition treatment.

Cold flow back pressures were measured with Sample C-3 and Sample C-4 before and after water submersion treatment at a flow rate of 600 m³/h. The test results are shown in Table 4.

TABLE 4

| Sample | Initial CFBP (mbar) | CFBP after attrition treatment (mbar) | Mass loss due to attrition treatment (g) |
|---|---|---|---|
| Comparative C-1 | 40.5 | 40.5 | 0.1 |
| C-3 | 47.9 | 45.9 | 2.5 |
| C-4 | 51.3 | 47.9 | 3.4 |

Figure 3:
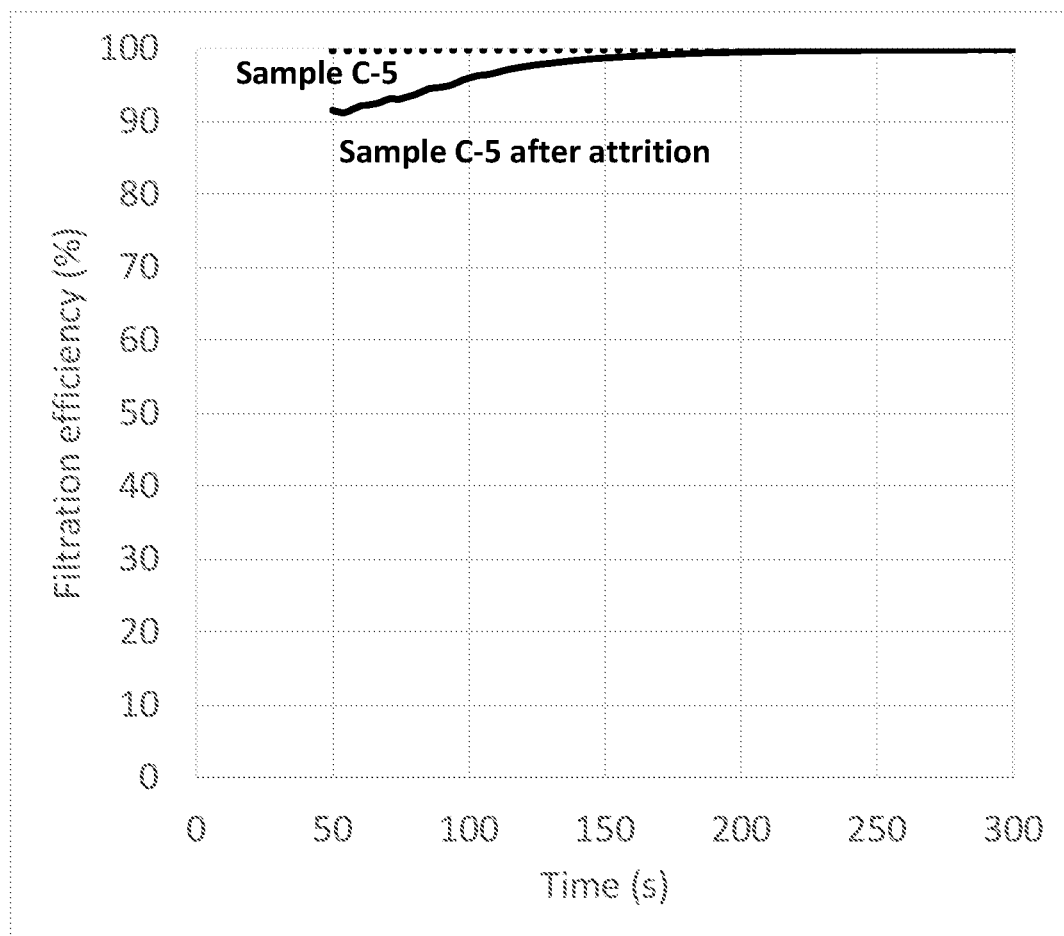
FIG. 3 compares the filtration efficiency data of fresh Sample C-5 and Sample C-5 after the attrition.

FIG. 3 compares the filtration efficiency data of fresh Sample C-5 and Sample C-5 after the attrition treatment. Only a slight decrease in filtration efficiency was observed after Sample C-5 went through the attrition treatment.

In this specification the term "dry powder" refers to a particulate composition that is not suspended or dissolved in a liquid. It is not meant to necessarily imply a complete absence of all water molecules. The dry powder is preferably free-flowing.

In this specification the term "tapped density" refers to the tapped density of the powder as measured according to Method 1 of Section 2.9.35 of European Pharmacopoeia 7.0 with 1250 taps.

In this specification the term "g/L" (grams per litre) refers to the mass of dry powder divided by the volume of the filter.

In this specification the terms "loading" and "mass loading" when referencing the quantity of powder, refer to the mass of powder added to a filter and may be measured by weighing the filter before and after application of the powder to the filter.

In this specification the term "$d_{50}$ (by volume)" refers to a $d_{50}$ (by volume) measurement as measured by a Malvern Mastersizer® 3000 with Aero s dispersion unit, available from Malvern Panalytical Ltd, Malvern, UK. Dispersion conditions: Air pressure=2 barg, feed rate=65%, hopper gap=1.2 mm. Refractive index and absorbtion parameters set in accordance with instructions provided in the Malvern Mastersizer® 3000 User Manual.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A method of forming an inorganic oxide coating on a monolith article for the treatment of an exhaust gas, the method comprising:
    providing a porous monolith article comprising a plurality of channels for the passage of an exhaust gas, each channel having a gas-contacting surface;
    spraying onto the gas-contacting surface, as a dry particulate aerosol, inorganic particles and a silicone resin to form a coating layer; and
    calcining the coating layer to provide a coated monolith article.

2. The method according to claim 1, wherein the monolith article is a catalytic wall-flow filter.

3. The method according to claim 1, wherein either:
    (i) the inorganic particles are sprayed onto the gas-contacting surface as a first dry particulate aerosol to form an inorganic particle layer and the silicone resin is then sprayed onto the inorganic particle layer as a second dry particulate aerosol to form the coating layer; or
    (ii) a mixture of the inorganic particles and silicone resin is sprayed onto the gas-contacting surface as a dry particulate aerosol to form the coating layer.

4. The method according to claim 1, wherein the silicone resin has a molecular weight of greater than 10,000, and less than 200,000.

5. The method according to claim 1, wherein the silicone resin has a glass transition temperature (Tg) of greater than 30° C. and less than 80° C.

6. The method according to claim 1, wherein the silicone resin has the formula $[R_xSiX_yO_z]_n$, wherein R is an alkyl or aryl, X is a functional group bonded to silicon, and wherein z is more than 1 and less than 2.

7. The method according to claim 6, wherein y is less than 1 and/or wherein y is less than x.

8. The method according to claim 6, wherein the silicone resin has a degree of crosslinking of greater than 65%, and less than 80%.

9. The method according to claim 6, wherein R is one or more of $C_1$-$C_6$ alkyls and phenyl.

10. The method according to claim 6, wherein X is one or more of OH and $C_1$-$C_6$ alkoxy.

11. The method according to claim 1, wherein the silicon dioxide content of the silicone resin is greater than 80 wt %.

12. The method according to claim 1, wherein the inorganic particles are selected from the group consisting of zeolites, refractory oxides, and their mixtures.

13. The method according to claim 12, wherein the inorganic particles are refractory oxide particles comprising calcium aluminate, fumed alumina, fumed silica, fumed titania, fumed zirconia, fumed ceria, alumina aerogel, silica aerogel, titania aerogel, zirconia aerogel, ceria aerogel or a mixture thereof.

14. The method according to claim 1, wherein the inorganic particles have a $d_{50}$ by volume of greater than 0.2 μm and less than 25 μm.

15. The method according to claim 1, wherein a mixture of the inorganic particles and silicone resin is sprayed onto the gas-contacting surface as a dry particulate aerosol to form the coating layer, and wherein in the mixture, the ratio of inorganic particles to silicone resin, by weight, is greater 0.9, and less than 2.5.

16. The method according to claim 1, wherein calcining comprises heating to a temperature of at least 400° C., and at most 530° C.

17. The method according to claim 1, wherein the monolith article comprises one or more platinum group metals.

18. The method according to claim 1, wherein the dry particulate aerosol is formed from a dry particulate composition having a tapped density of less than 1.5 g/cm$^3$.

* * * * *